(12) United States Patent
Drzymala et al.

(10) Patent No.: US 8,534,556 B2
(45) Date of Patent: Sep. 17, 2013

(54) ARRANGEMENT FOR AND METHOD OF REDUCING VERTICAL PARALLAX BETWEEN AN AIMING PATTERN AND AN IMAGING FIELD OF VIEW IN A LINEAR IMAGING READER

(75) Inventors: Mark Drzymala, Commack, NY (US); Edward Barkan, Miller Place, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 192 days.

(21) Appl. No.: 12/911,974

(22) Filed: Oct. 26, 2010

(65) Prior Publication Data

US 2012/0097744 A1    Apr. 26, 2012

(51) Int. Cl.
*G06K 7/14* (2006.01)
(52) U.S. Cl.
USPC ......................................................... 235/454
(58) Field of Classification Search
None
See application file for complete search history.

(56) References Cited

U.S. PATENT DOCUMENTS

| | | | |
|---|---|---|---|
| 6,340,114 B1* | 1/2002 | Correa et al. | 235/462.22 |
| 6,592,040 B2* | 7/2003 | Barkan et al. | 235/472.01 |
| 2005/0092841 A1* | 5/2005 | Barkan | 235/462.25 |
| 2006/0146171 A1* | 7/2006 | Barkan et al. | 348/340 |
| 2007/0170259 A1* | 7/2007 | Nunnink et al. | 235/462.21 |
| 2010/0155481 A1* | 6/2010 | Vinogradov et al. | 235/462.21 |
| 2011/0297853 A1* | 12/2011 | Liu et al. | 250/566 |

* cited by examiner

*Primary Examiner* — Christle Marshall
(74) *Attorney, Agent, or Firm* — Nong-Qiang Fan

(57) ABSTRACT

Vertical parallax between an imaging linear field of view (FOV) and an aiming light pattern is reduced in a reader for electro-optically reading symbols to be read by image capture by an arrangement that includes an imaging assembly having a solid-state imager with a linear array of image sensors, and an imaging lens for capturing return light over the imaging linear FOV from a symbol and for projecting the captured return light onto the linear array, an aiming light assembly spaced vertically away from the imaging assembly for generating the aiming light pattern on the symbol prior to reading, and an optical assembly for intercepting the aiming light pattern and for vertically aligning the aiming light pattern with the imaging linear FOV to reduce the vertical parallax.

18 Claims, 5 Drawing Sheets

ARRANGEMENT FOR AND METHOD OF REDUCING VERTICAL PARALLAX BETWEEN AN AIMING PATTERN AND AN IMAGING FIELD OF VIEW IN A LINEAR IMAGING READER

DESCRIPTION OF THE RELATED ART

Solid-state imaging systems or imaging readers have been used, in both handheld and/or hands-free modes of operation, to electro-optically read one-dimensional bar code symbols, particularly of the Universal Product Code (UPC) symbology having a row of bars and spaces spaced apart along a linear scan direction. The handheld imaging reader includes a housing held by an operator, and an imaging module supported by the housing and aimed by the operator at each symbol prior to reading. The imaging module includes an imaging assembly having a solid-state imager with a sensor array of photocells or light sensors, and an imaging lens system for capturing return light scattered and/or reflected from a symbol being imaged over an imaging field of view, and for projecting the return light onto the sensor array to initiate capture of an image of the symbol.

Such an imager may include a one-dimensional charge coupled device (CCD) or a complementary metal oxide semiconductor (CMOS) device and associated circuits for producing and processing electrical signals corresponding to a one-dimensional array of pixel data over the imaging field of view. The imager captures the return light under the control of a controller or programmed microprocessor that is operative for processing the electrical signals from the imager and for decoding the electrical signals into decoded information indicative of the symbol being imaged and read.

In order to increase the amount of the return light captured by the sensor array, especially in dimly lit environments and/or at far range reading, the imaging module generally also includes an illuminating light assembly for illuminating the symbol with illumination light for reflection and scattering therefrom. When the sensor array is one-dimensional, i.e., linear, the illumination light preferably is distributed along a short height, distributed illumination pattern, also termed an illuminating line, that extends lengthwise along the symbol. The distributed illumination pattern is typically generated by using a pair of spaced-apart light emitting diodes (LEDs) and a pair of cylindrical lenses. The illuminating LEDs are typically mounted at opposite sides of the sensor array on the same printed circuit board (PCB).

Since the operator of the imaging reader cannot see exactly whether a symbol is located entirely within the imaging field of view of the sensor array, or know whether the symbol is optimally centrally located within the imaging field of view, the imaging module also typically includes an aiming light assembly for projecting a visible aiming light pattern, for example, a generally circular spot, or a cross-hairs, for placement at or near the center of the symbol, or an aiming line, or a series of generally circular spots linearly spaced apart, for placement lengthwise along the symbol, to assist the operator in visually locating the symbol within the imaging field of view and, thus, advise the operator in which direction the reader is to be moved in order to accurately position the aiming light pattern on the symbol prior to reading. The aiming light assembly includes at least one aiming light source, such as a laser or an LED, an aiming lens, and, optionally, a pattern shaping optical element, such as a diffractive optical element (DOE), or a refractive optical element (ROE). The focused light passing through a respective DOE forms multiple diverging beamlets, which project continuous lines or rows of spots arrayed in the aiming light pattern on the target to indicate the imaging field of view.

As advantageous as such known imaging readers have been, they have proven to be less than satisfactory in certain situations. For example, the aiming light assembly is typically mounted on the same PCB as the imager and the illuminating LEDs, and is also elevated above the imager at a distance of a few millimeters away from the imager, because the available space at the sides of the imager is already occupied by the illuminating LEDs. In such event, the aiming light pattern is vertically offset from the imaging field of view by a few millimeters. This offset problem is particularly acute when a one-dimensional imager that is, for example, only one pixel tall is employed, because an offset of a few millimeters cannot be tolerated for efficient reading performance.

SUMMARY OF THE INVENTION

The present invention generally relates to a reader for electro-optically reading symbols to be read by image capture and, more particularly, to an imaging reader that includes an imaging assembly having a solid-state imager with a linear array of image sensors, such as a CCD or a CMOS, and an imaging lens system, such as one or more imaging lenses, advantageously a doublet or a Cooke triplet, operative for capturing return light over an imaging linear field of view (FOV) from a symbol and for projecting the captured return light onto the linear array, as well as an aiming light assembly spaced vertically away from the imaging assembly and operative for generating an aiming light pattern on the symbol prior to reading. The aiming light assembly preferably includes an aiming light source, such as a laser, for emitting an aiming light beam, and an aiming lens for optically modifying the aiming light beam to project the aiming pattern on the symbol. The aiming pattern can be a generally circular aiming spot, or a cross-hairs, or a plurality of generally circular aiming spots, or an aiming line. The imaging assembly is preferably mounted at a lower elevation on a printed circuit board (PCB), and the aiming light assembly is mounted at a higher elevation on the same PCB.

One aspect of the present invention resides, briefly stated, in an arrangement for reducing vertical parallax between the imaging linear FOV and the aiming light pattern. The arrangement includes an optical assembly for intercepting the aiming light pattern and for vertically aligning the aiming light pattern with the imaging linear FOV to reduce the vertical parallax. The optical assembly includes an upper fold mirror located at the higher elevation, and a lower fold mirror at the lower elevation. The upper fold mirror redirects the intercepted aiming light pattern to the lower fold mirror. The lower fold mirror reflects the aiming light pattern incident thereon outwardly toward the symbol at the same lower elevation as the imaging assembly.

Advantageously, the assemblies are mounted at least in part on the same PCB that, in turn, is mounted in a handheld housing. The PCB is advantageously tilted at an acute angle of inclination relative to the vertical. In the preferred embodiment, the tilted PCB is mounted within a tilted handle of the housing. An illumination light assembly is also advantageously mounted at least in part on the same tilted PCB, and is operative for illuminating the symbol. The illumination light assembly includes a pair of illumination light emitting diodes (LEDs) spaced apart from each other, and a pair of illumination lenses, one for each illumination LED. The illumination LEDs are located at opposite sides of the imager on the same tilted PCB. The housing has a window through which the return light, the aiming light and the illumination light pass. The window may be tilted relative to the horizontal to avoid reflections of the emitted illumination light from reaching the imaging lens system.

Another feature of the present invention resides in a method of reducing vertical parallax between an imaging linear field of view (FOV) and an aiming light pattern in a reader for electro-optically reading symbols to be read by image capture. The method is performed by capturing return light over the imaging linear FOV from a symbol, projecting the captured return light onto a linear array of image sensors of a solid-state imager, generating the aiming light pattern on the symbol prior to reading with an aiming light assembly spaced vertically away from the imager, intercepting the aiming light pattern, and vertically aligning the aiming light pattern with the imaging linear FOV to reduce the vertical parallax.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
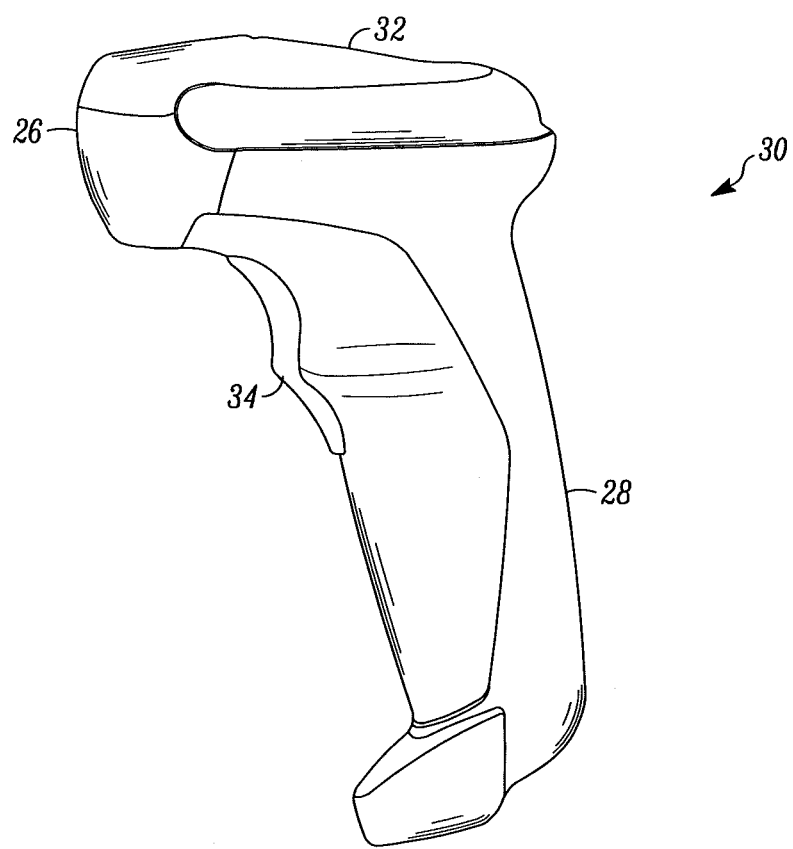
FIG. 1 is a side elevational view of a portable handheld imaging reader for electro-optically reading symbols to be read by image capture that can use and benefit from an arrangement for reducing vertical parallax between an imaging linear field of view (FOV) and an aiming light pattern in accordance with this invention.

Reference numeral 30 in FIG. 1 generally identifies an ergonomic imaging reader configured as a gun-shaped housing having an upper barrel or body 32 and a lower handle 28 tilted rearwardly away from the body 32 at an angle of inclination, for example, fifteen degrees, relative to the vertical. A window 26 is located adjacent the front or nose of the body 32 and is preferably also tilted at an angle of inclination, for example, fifteen degrees, relative to the vertical. The imaging reader 30 is held in an operator's hand and used in a handheld mode in which a trigger 34 is manually depressed to initiate imaging of target indicia, especially one-dimensional symbols, to be read in a range of working distances relative to the window 26. Housings of other configurations can also be employed.

Figure 2:
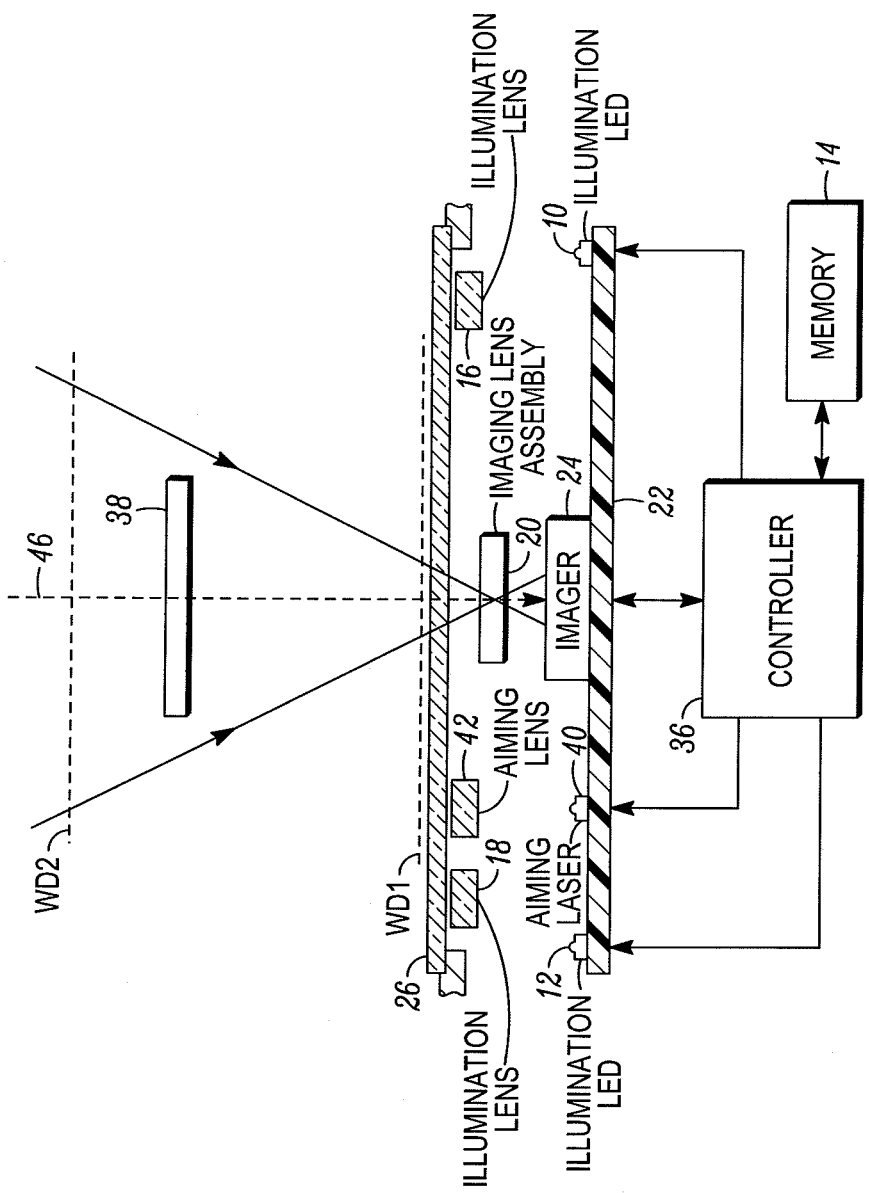
FIG. 2 is a schematic diagram of various components of the reader of FIG. 1.
Figure 3:
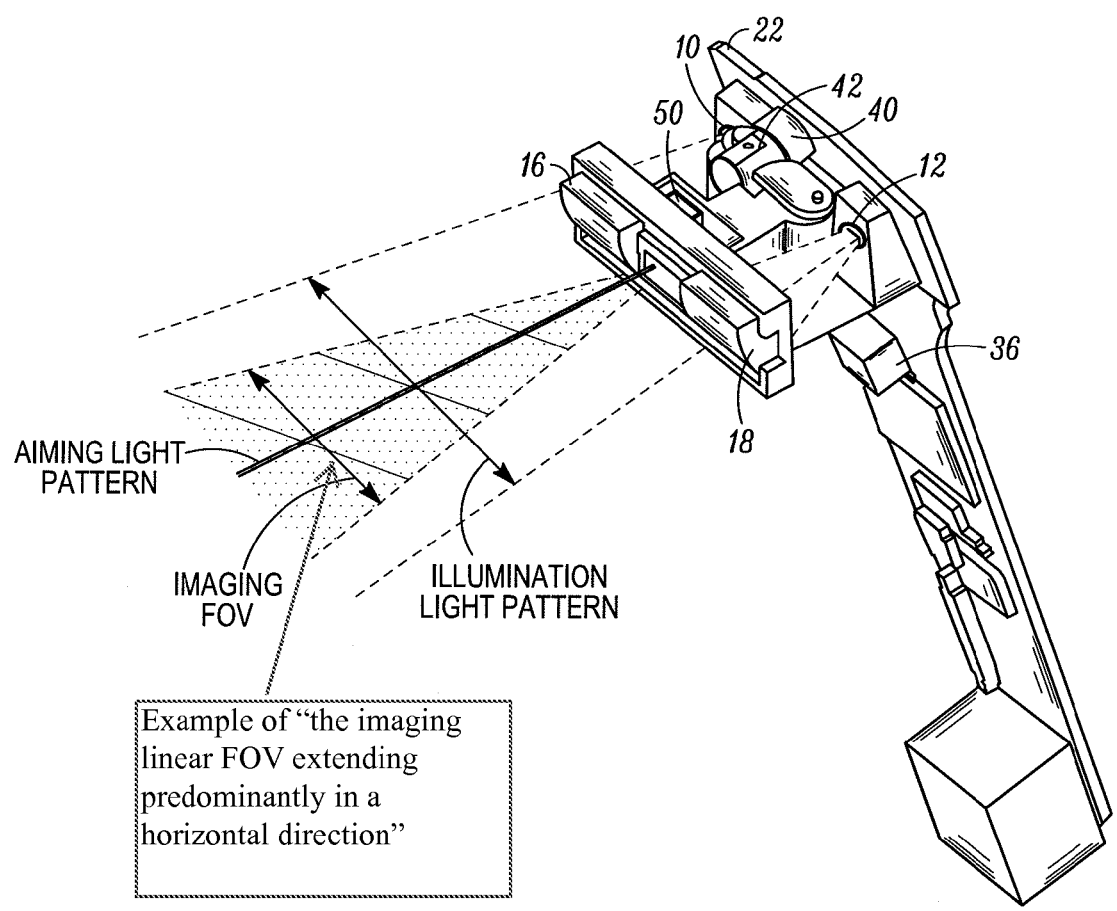
FIG. 3 is a perspective view of various components of the reader of FIG. 1.

As schematically shown in FIG. 2, an imaging assembly includes an imager 24 mounted on a printed circuit board (PCB) 22 in the reader 30. The PCB 22 is mounted within the tilted handle 28 and is also tilted, as shown in FIG. 3, at an angle of inclination, for example, fifteen degrees, relative to the vertical. The imager 24 is a solid-state device, for example, a CCD or a CMOS imager having a one-dimensional array of addressable image sensors or pixels arranged in a single, linear row, and operative for detecting return light captured by an imaging lens assembly or system 20 along an imaging axis 46 through the window 26 over a linear imaging field of view (FOV). The return light is scattered and/or reflected from a target or symbol 38 over the imaging FOV that is generally perpendicular to the imaging axis 46.

The imaging lens assembly 20 is operative for focusing the return light onto the array of image sensors to enable the symbol 38 to be read. The symbol 38 may be located anywhere in a working range of distances between a close-in working distance (WD1) and a far-out working distance (WD2). In a preferred embodiment, WD1 is about one-half inch from the window 26, and WD2 is about thirty inches from the window 26. The imaging lens assembly 20 is located remotely from the window 26, for example, over forty millimeters away.

An illuminating light assembly is also mounted in the imaging reader and includes an illumination light source, e.g., at least one light emitting diode (LED), and preferably a plurality of LEDs, such as a pair of illumination LEDs 10, 12 mounted on the PCB 22, and a pair of illumination lenses 16, 18 configured to generate a substantially uniform distributed illumination pattern of light on and along the symbol 38 to be read by image capture. At least part of the scattered and/or reflected return light is derived from the illumination pattern of light on and along the symbol 38. The window 26 is tilted to avoid reflections of the illumination light from the LEDs 10,12 from reaching the imaging lens assembly 20.

Although in some applications, the illuminating light assembly itself can serve as an aiming aid, it is preferred to provide a separate aiming light assembly to increase the range at which aiming light patterns can be seen on symbols and also to help counter the effect of sunlight washing out the aiming light patterns. The separate aiming light assembly is also mounted in the imaging reader, and includes an aiming light source 40, e.g., a laser or at least one light emitting diode (LED), also mounted on the PCB 22 and operative for emitting an aiming beam, and an aiming lens 42 for shaping the aiming beam emitted by the aiming light source 40 to project an aiming light pattern on the symbol 38 prior to reading. The aiming pattern can be a generally circular aiming spot, or a cross-hairs, or a plurality of generally circular aiming spots, or an aiming line. The aiming light assembly is preferably located in a close confronting relationship with the window 26, for example, no more than a few millimeters away. A laser is preferred for the aiming light source 40 since it can generate light of greater intensity than an LED.

As diagrammatically shown in FIG. 2, the imager 24, the illumination LEDs 10, 12 and the aiming light source 40 are operatively connected to a controller or programmed microprocessor 36 operative for controlling the operation of these components. A memory 14 is connected and accessible to the controller 36. Preferably, the microprocessor 36 is also used for processing the electrical signals from the imager 24 and for processing and decoding the captured target images. The controller 36 and the memory 14 are advantageously mounted on the PCB 22.

In operation, the microprocessor 36 sends command signals to initially energize the aiming light source 40 to project an aiming light pattern on the target symbol 38, and then, to energize the illumination LEDs 10, 12 for a short exposure time period, say 500 microseconds or less, and to energize and expose the imager 24 to collect the return light, e.g., illumination light and/or ambient light, from the target symbol 38 only during said exposure time period. A typical array needs about 18-33 milliseconds to acquire the entire target image and operates at a frame rate of about 30-60 frames per second.

Figure 4:
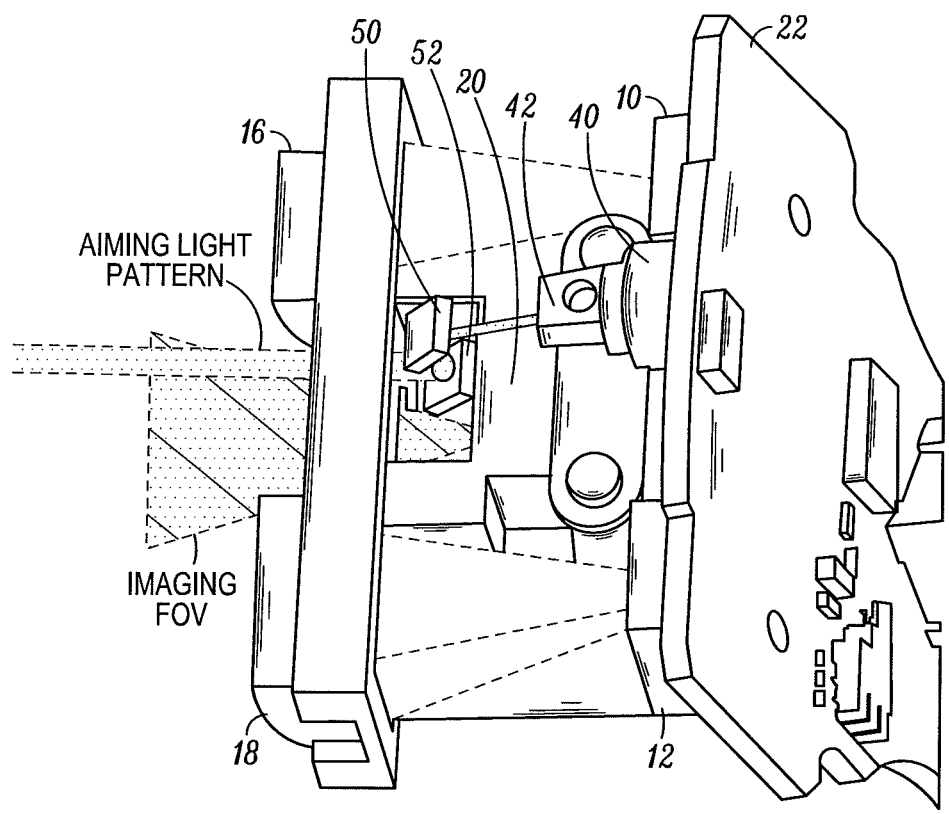
FIG. 4 is an enlarged, overhead, perspective view of the components of FIG. 3 depicting operation of the vertical parallax reducing arrangement of this invention.
Figure 5:
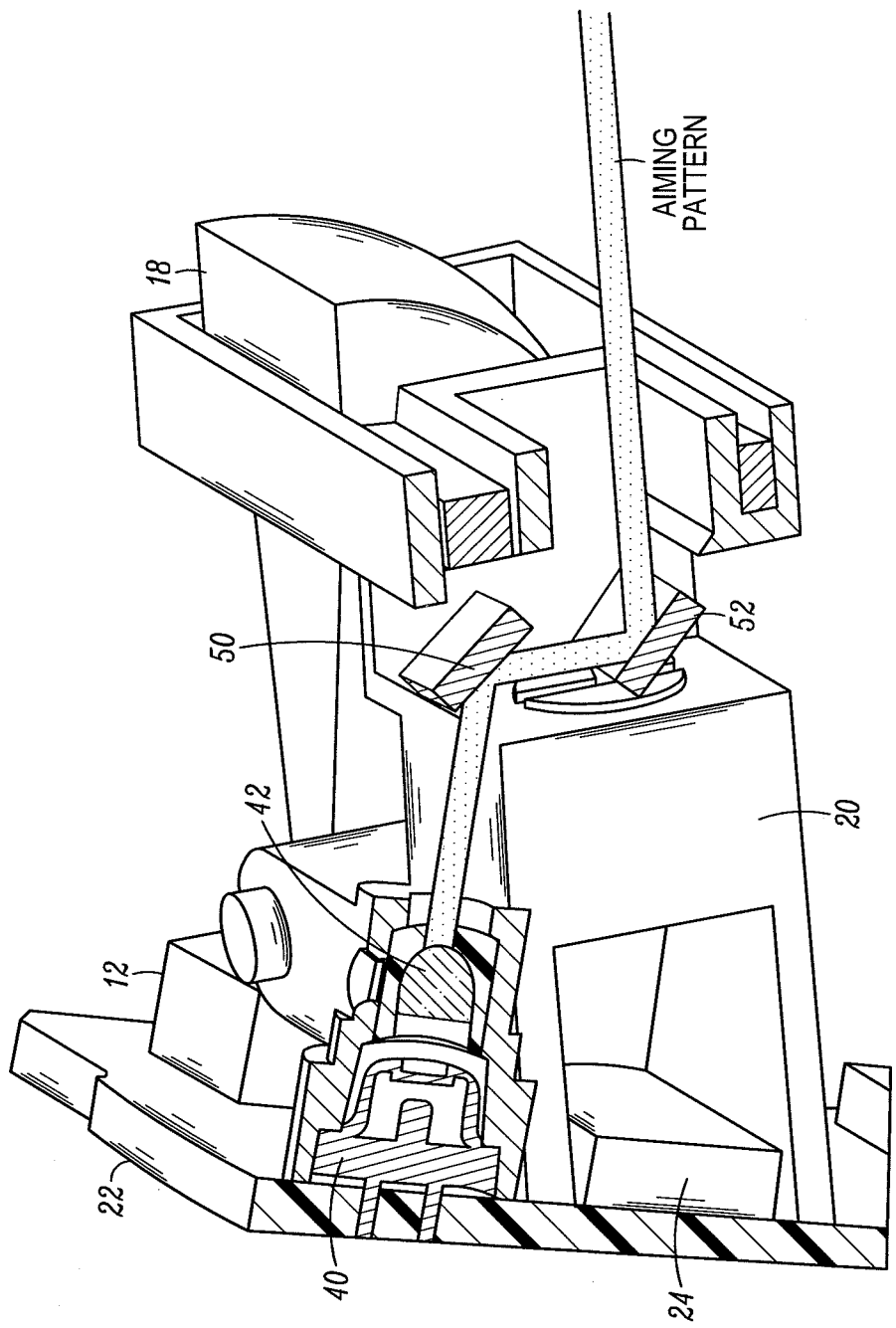
FIG. 5 is a partially broken-away, enlarged side view depicting operation of the vertical parallax reducing arrangement of FIG. 4.

Turning now to FIGS. 3-5, the imaging assembly 20, 24 is preferably mounted at a lower elevation on the PCB 22, and the aiming light assembly 40, 42 is mounted at a higher elevation on the same PCB 22. The illumination LEDs 10, 12 are located at opposite sides of the imager 24 on the same PCB 22, and the aiming light assembly 40, 42 is above the imager 24. As described above, this physical arrangement causes the aiming light pattern to be vertically offset from the imaging FOV by a few millimeters. This offset problem is particularly acute when the imager 24 is one-dimensional and is, for example, only one pixel tall, because an offset of a few millimeters cannot be tolerated for efficient reading performance.

One aspect of the present invention resides in an arrangement for, and a method of, reducing such a vertical offset or parallax between the imaging linear FOV and the aiming light pattern. The arrangement includes an optical assembly for intercepting the aiming light pattern and for vertically aligning the aiming light pattern with the imaging linear FOV to reduce the vertical parallax. The optical assembly includes an upper fold mirror 50 located at the higher elevation, and a lower fold mirror 52 located at the lower elevation. The upper fold mirror 50 redirects the intercepted aiming light pattern to the lower fold mirror 52. The lower fold mirror 52 reflects the aiming light pattern incident thereon outwardly through the window 26 toward the symbol 38 at the same lower elevation as the imaging assembly 20, 24.

It will be understood that each of the elements described above, or two or more together, also may find a useful application in other types of constructions differing from the types described above. For example, the optical assembly could be replaced by other light folding components, such as optical wedges or prisms. In addition, rather than a pair of fold mirrors, a single fold mirror could be employed if the aiming light assembly 40, 42 were mounted overhead and emitted its aiming beam vertically downwardly.

While the invention has been illustrated and described as an arrangement for, and a method of, reducing vertical parallax between an imaging linear FOV and an aiming light pattern in an imaging reader, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. In a reader for electro-optically reading symbols to be read by image capture, an arrangement for reducing vertical parallax between an imaging linear field of view (FOV) and an aiming light pattern, the arrangement comprising:
an imaging assembly mounted on a tilted printed circuit board (PCB) within a tilted handle of the reader including a solid-state imager having a linear array of image sensors, and an imaging lens system for capturing return light over the imaging linear FOV from a symbol and for projecting the captured return light onto the linear array, the imaging linear FOV extending predominantly in a horizontal direction, wherein the PCB and the handle are tilted relative to the vertical;
an aiming light assembly spaced vertically away from the imaging assembly on the tilted PCB within the tilted handle of the reader, for generating the aiming light pattern on the symbol prior to reading; and
an optical assembly for intercepting the aiming light pattern and for vertically aligning the aiming light pattern with the imaging linear FOV substantially on a same horizontal plane that is parallel to both the horizontal direction and a principle propagation direction of the aiming light pattern to reduce the vertical parallax.

2. The arrangement of claim 1, wherein the imager is one of a one-dimensional charge coupled device and a one-dimensional complementary metal oxide silicon device.

3. The arrangement of claim 1, wherein the aiming light assembly includes an aiming light source for emitting an aiming light beam, and an aiming lens for optically modifying the aiming light beam to project the aiming pattern on the symbol.

4. The arrangement of claim 3, wherein the aiming light source is a laser for emitting an aiming laser beam, and wherein the aiming lens is operative for optically modifying the aiming laser beam to project the aiming pattern on the symbol as one of a generally circular aiming spot, a crosshairs, a plurality of generally circular aiming spots, and an aiming line.

5. The arrangement of claim 1, wherein the imager is mounted at a lower elevation on the tilted PCB, and wherein the aiming light assembly is located above the imager and is mounted at least in part at a higher elevation on the same PCB.

6. The arrangement of claim 5, wherein the optical assembly includes an upper fold mirror at the higher elevation, and a lower fold mirror at the lower elevation, and wherein the upper fold mirror redirects the intercepted aiming light pattern to the lower fold mirror.

7. The arrangement of claim 1, and further comprising a handheld housing in which the assemblies are mounted.

8. The arrangement of claim 1, and further comprising an illumination light assembly for illuminating the symbol, and including a pair of illumination light emitting diodes (LEDs) spaced apart from each other, and a pair of illumination lenses, one for each illumination LED.

9. The arrangement of claim 8, wherein the illumination LEDs are located at opposite sides of the imager on the same PCB.

10. An imaging reader for electro-optically reading symbols by image capture, comprising:
a housing with a tilted handle;
a tilted printed circuit board (PCB) mounted in the tilted handle of the housing, wherein the PCB and the handle are tilted relative to the vertical; and
an imaging module mounted on the tilted PCB within the tilted handle including
an imaging assembly having a solid-state imager with a linear array of image sensors mounted on the PCB, and an imaging lens for capturing return light over an imaging linear field of view (FOV) from a symbol and for projecting the captured return light onto the linear array, the imaging linear FOV extending predominantly in a horizontal direction,
an aiming light assembly mounted at least in part on the PCB and spaced vertically away from the imaging assembly on the tilted PCB within the tilted handle, for generating an aiming light pattern on the symbol prior to reading, and an optical assembly for intercepting the aiming light pattern and for vertically aligning the aiming light pattern with the imaging linear FOV substantially on a same horizontal plane that is parallel to both the horizontal direction and a principle propagation direction of the aiming light pattern to reduce vertical parallax between the aiming light pattern and the imaging linear FOV.

11. A method of reducing vertical parallax between an imaging linear field of view (FOV) and an aiming light pattern in a reader for electro-optically reading symbols to be read by image capture, comprising the steps of:

capturing return light over the imaging linear FOV from a symbol, and projecting the captured return light onto a linear array of image sensors of a solid-state imager mounted on a tilted printed circuit board within a tilted handle of the reader, the imaging linear FOV extending predominantly in a horizontal direction, wherein the PCB and the handle are tilted relative to the vertical;

generating the aiming light pattern on the symbol prior to reading with an aiming light assembly spaced vertically away from the imager on the tilted PCB within the tilted handle of the reader; and intercepting the aiming light pattern, and vertically aligning the aiming light pattern with the imaging linear FOV substantially on a same horizontal plane that is parallel to both the horizontal direction and a principle propagation direction of the aiming light pattern to reduce the vertical parallax.

12. The method of claim 11, and further comprising the step of configuring the imager as one of a one-dimensional charge coupled device and a one-dimensional complementary metal oxide silicon device.

13. The method of claim 11, wherein the generating step is performed by an aiming light source that emits an aiming light beam, and by an aiming lens that optically modifies the aiming light beam to project the aiming pattern on the symbol.

14. The method of claim 13, and further comprising the step of configuring the aiming light source as a laser that emits an aiming laser beam, and wherein the aiming lens optically modifies the aiming laser beam to project the aiming pattern on the symbol as one of a generally circular aiming spot, a cross-hairs, a plurality of generally circular aiming spots, and an aiming line.

15. The method of claim 11, and further comprising the step of mounting the imager at a lower elevation on the tilted PCB, and mounting the aiming light assembly at least in part above the imager at a higher elevation on the same PCB.

16. The method of claim 15, wherein the intercepting and aligning steps are performed by an upper fold mirror at the higher elevation, and by a lower fold mirror at the lower elevation, and wherein the upper fold mirror redirects the intercepted aiming light pattern to the lower fold mirror.

17. The method of claim 11, and further comprising the step of illuminating the symbol with a pair of illumination light emitting diodes (LEDs) spaced apart from each other, and with a pair of illumination lenses, one for each illumination LED.

18. The method of claim 17, and further comprising the step of mounting the illumination LEDs at opposite sides of the imager on the same PCB.

\* \* \* \* \*